May 2, 1950　　　M. DWYER ET AL　　　2,505,950
LAUNCHING OR DISCHARGING EQUIPMENT FOR SIGNALING
Filed Aug. 5, 1947　　　　　　　　　　　　5 Sheets-Sheet 1

INVENTOR.
MARTIN DWYER
BY CHI MOU TSANG
Kenyon & Kenyon
ATTORNEYS

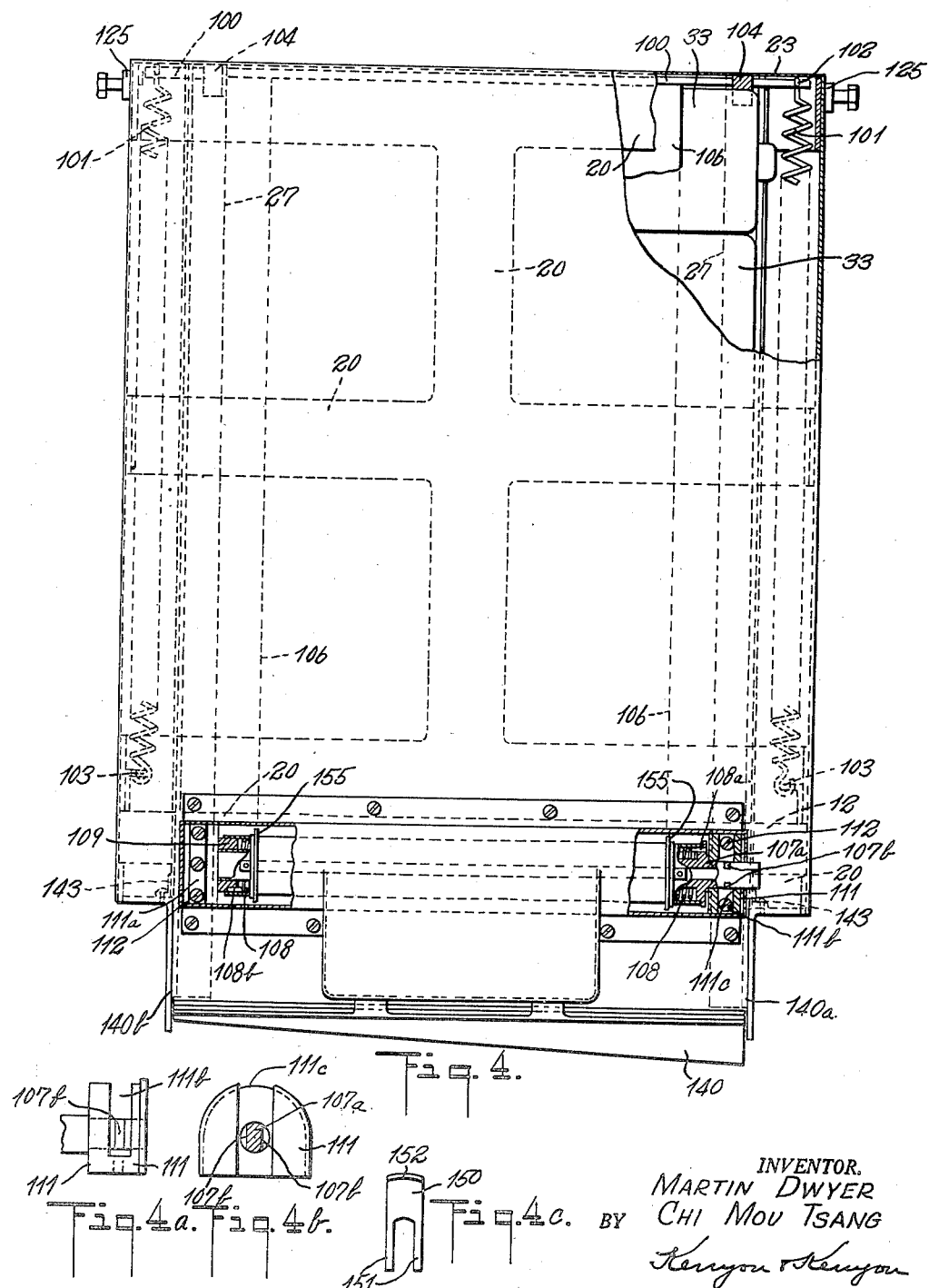

May 2, 1950 M. DWYER ET AL 2,505,950
LAUNCHING OR DISCHARGING EQUIPMENT FOR SIGNALING
Filed Aug. 5, 1947 5 Sheets-Sheet 4
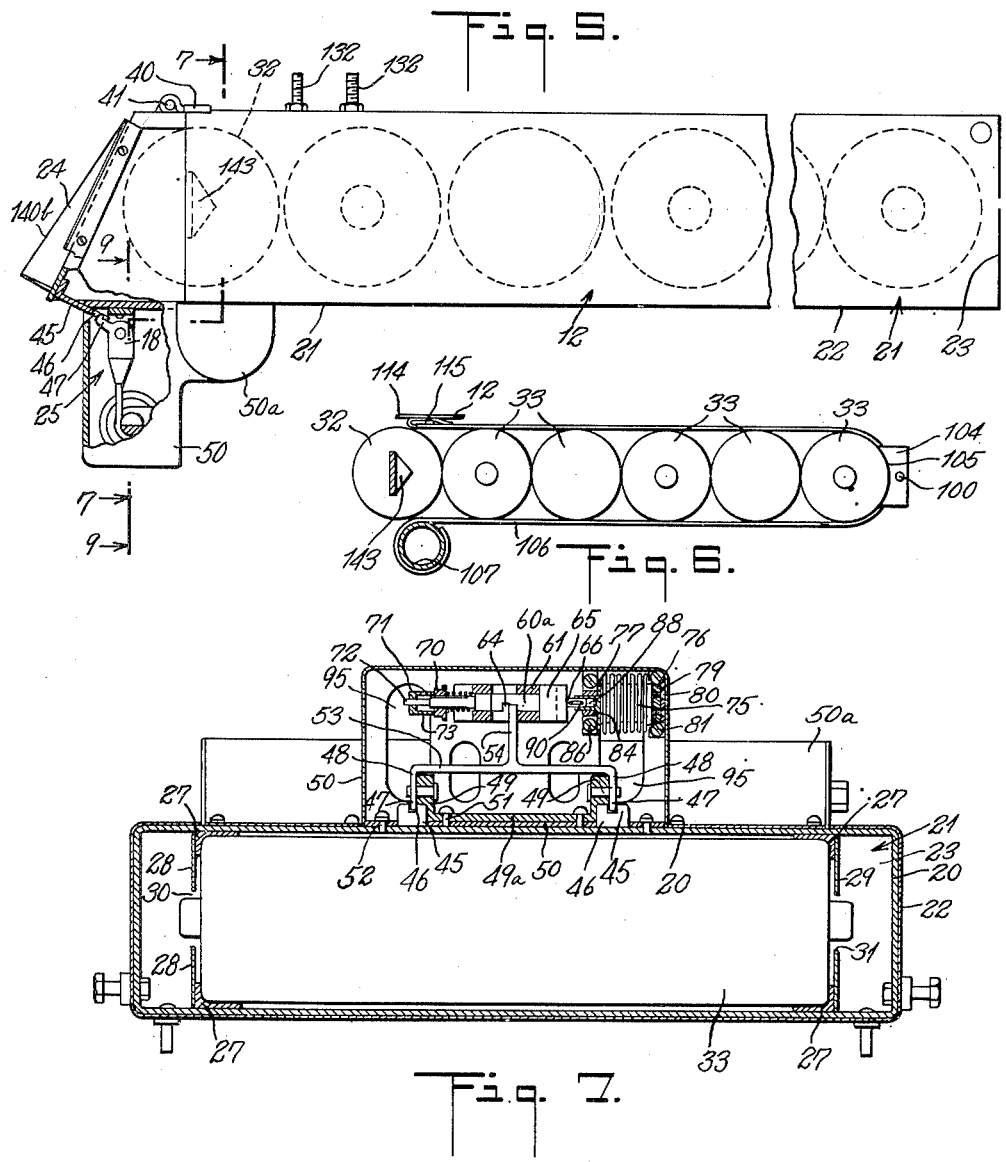

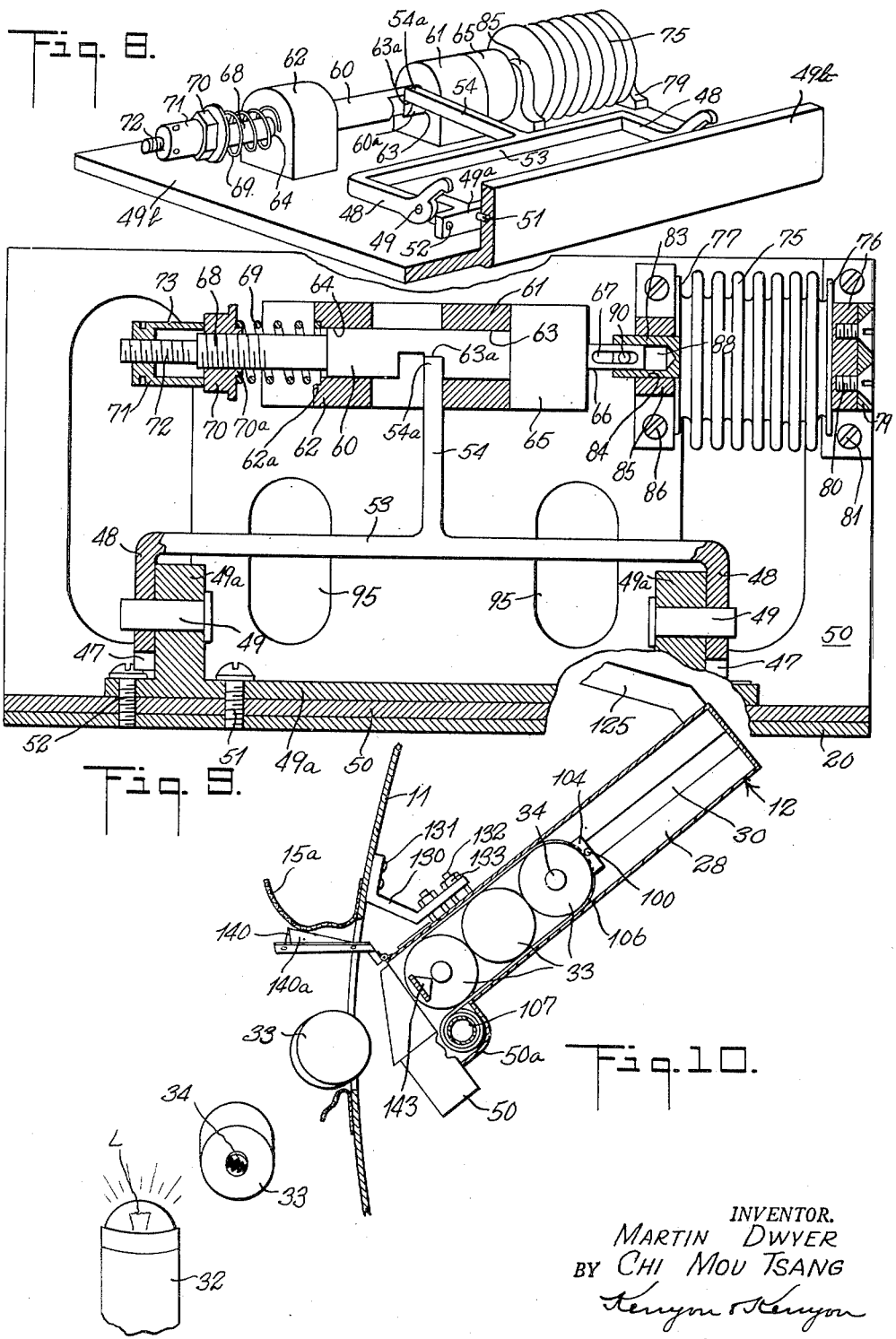

Patented May 2, 1950

2,505,950

UNITED STATES PATENT OFFICE 2,505,950

LAUNCHING OR DISCHARGING EQUIPMENT FOR SIGNALING

Martin Dwyer, Hewlitt, and Chi Mou Tsang, Freeport, N. Y., assignors to Aerial Products, Inc., Merrick, N. Y., a corporation of Delaware Application August 5, 1947, Serial No. 766,248

6 Claims. (Cl. 244—136)

This invention relates to launching or discharging equipment and more particularly to equipment of this character that is adapted to be installed in aircraft, or fast moving vessels or other vehicles for automatic operation upon the occurrence of an accident to discharge or launch signals, rescue devices or other types of useful articles, devices or contents from the equipment that will facilitate location of the scene of the accident, and the vehicle involved in such accident, and/or its survivors, and/or be useful to survivors until rescued.

A principal object of this invention is to provide launching or discharge equipment of the general character described that may be installed permanently in a vehicle such as an airplane, for example, in which various devices useful in the event of an accident may be loaded and stored previous to departure and which, in the event of an accident, will be discharged or expelled automatically from the equipment.

Another principal object of the invention is to provide launching or discharge equipment of the character described which will be responsive to the crash impact of an accident to the aircraft or other vehicle in which it is installed to effect automatic release and discharge of the aforesaid stored useful devices from said equipment into areas in the vicinity of the accident, and which equipment is positive in its action regardless of fuselage position provided that the aircraft crashes with the engine first.

Still another object of the invention is to provide launching or discharge equipment of the character described which will be responsive to water pressure resulting from submergence of the aircraft or other vessel in which it is installed to effect automatic release and discharge of the aforesaid stored useful devices from said equipment into the water in the vicinity of the accident.

Still another object of the invention is to provide launching or discharge equipment of the character described in which both crash impact responsive means and water pressure responsive means are provided to effect automatic release and discharge of the aforesaid stored useful devices in the event of an accident, and in which the water pressure responsive means for effecting said automatic release and discharge is operative even in the event of failure of operation of said crash impact responsive means.

Still another object of the invention is to provide launching or discharge equipment of the character described, equipped with either type of responsive means to effect required release and discharge of the aforesaid stored useful devices.

Generally automatic launching or discharging equipment embodying the invention comprises a supporting means or storage device adapted to be permanently installed within an airplane, boat or other vehicle. Devices or contents useful in the event of an accident are loaded and stored within the storage device. A retaining arrangement or means is provided for the storage device to retain the contents loaded and stored therein until the occurrence of an accident. Inertia or crash impact actuated and also water-pressure actuated release mechanisms or either of such two are provided in conjunction with the retaining arrangement or means to maintain the latter in retaining position until an accident occurs. On such occurrence, either the crash impact resulting from the accident or water pressure resulting from sinking or submergence in water of the aircraft or other vehicle involved in the accident will operate or trip the release mechanisms to free the retaining arrangement or means. Discharging or expelling arrangements are provided within the storage device which then effect the expulsion of stored contents of the storage device forcefully into the area or body of water in the vicinity of the accident and clear of the vehicle involved.

Useful contents, for example, that may be stored by the launching or discharging equipment for automatic discharge or expulsion in the event of an accident as described, may be night and daytime signalling devices to facilitate location of the scene, rescue devices for survivors, food packages, weapons, tools and a great variety of other types of articles useful for emergency purposes.

In practice such useful articles are packed preferably in substantially uniformly sized and shaped individual containers. Preferably, a group of such individual containers, selected so that one or more of them have different types of contents from the others are loaded and stored within the storage device of the launching or discharge equipment of the particular aircraft, boat or other vehicle prior to departure. The choice of contents depends upon the vehicle and its mission. The entire group is intended to be expelled from the launching or discharging equipment automatically as described upon the occurrence of an accident to the vehicle. Since some of the individual containers of the group may have contents that should be automatically expelled from the individual containers, after the latter have been launched either a short time after launching, or at successively longer periods of time after the accident has occurred, means are also provided within the launching or discharging equipment to act upon or to condition appropriate means associated with any of such individual containers as they are expelled with the group from the launching or discharging equipment at the time of the accident to activate such appropriate means at such time.

Other objects include the provision of simple effective arrangements for providing effective equipment of the character described.

To the accomplishment of the foregoing and such other objects as may hereinafter appear, this invention consists in the novel construction and arrangement of parts hereafter to be described and then sought to be defined in the appended claims, reference being had to the accompanying drawings, forming part hereof, which show merely for the purposes of illustrative disclosure a preferred embodiment of the invention, it being expressly understood, however, that changes may be made in practice within the scope of the claims without digressing from the inventive idea.

In the drawings in which similar reference characters denote corresponding parts and in which sectional views are seen in the direction of the arrows:

Fig. 4 is a similarly enlarged bottom plan view of the launching and discharging equipment of Fig. 3, also partially broken away and partially sectionalized to show other structural details;

Figs. 4a, 4b and 4c are respectively side end and side elevations of structural details;

Fig. 5 is a side elevation of the launching or discharging equipment of Figs. 3 and 4 also partially broken away and sectionalized to illustrate additional structural details, and as viewed from the right of Fig. 3;

Fig. 6 is a fragmentary sectional view on a reduced scale taken along line 6—6 of Fig. 3;

Fig. 7 is a sectional view taken generally along line 7—7 of Fig. 5;

Fig. 8 is an enlarged perspective view of the crash impact operated and water-pressure actuated trip or release mechanisms for the retaining means of the launching or discharging equipment;

Figure 1:
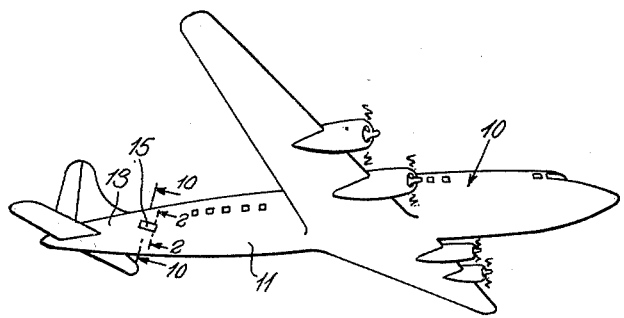
Fig. 1 is a perspective view in flight of a vehicle such as an airplane in which launching or discharging equipment embodying the invention has been installed.

Fig. 9 is an enlarged fragmentary sectional view similar to that of Fig. 7 of the crash impact operated and water-pressure actuated trip or release mechanisms; and Fig. 10 is a sectional view on an enlarged scale taken along line 10—10 of Fig. 1 showing actual positions of parts of the launching or discharging equipment after the trip or release mechanisms have been actuated as a result of an accident and during operation of the expelling arrangements.

While the automatic launching or discharging equipment embodying the invention will hereinafter be described specifically with reference to its installation in an airplane, it is to be understood that it can be installed in ships or other vehicles as well and no specific limitations to aircraft installations are intended.

Figure 2:
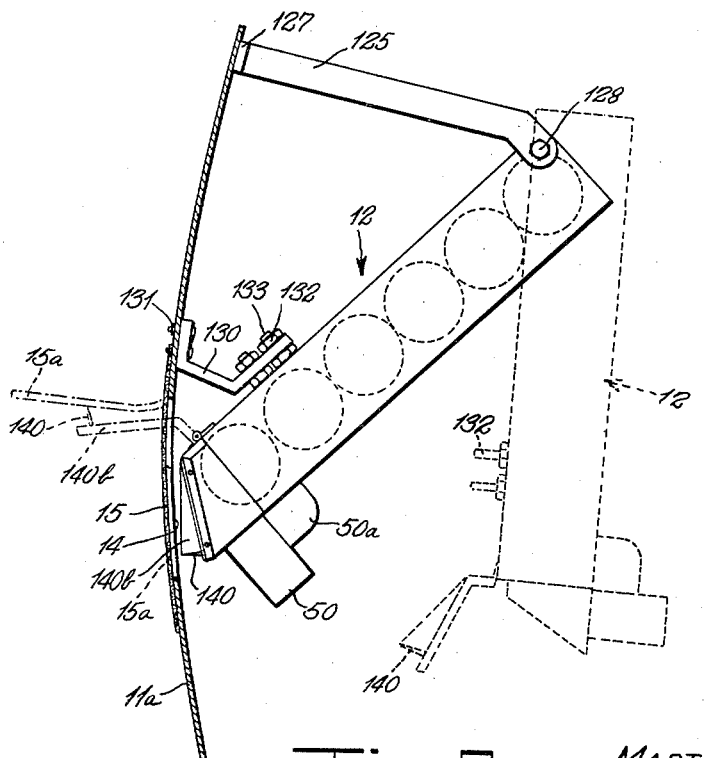
Fig. 2 is an enlarged fragmentary section taken along line 2—2 of Fig. 1 illustrating such launching or discharging equipment in side elevation as it has been installed and supported within the airplane.

Referring now to the drawing and first to Figs. 1 and 2, 10 denotes an airplane (Fig. 1) within whose fuselage 11 an automatic launching or discharging equipment 12 (Fig. 2) is installed preferably though not necessarily near the tail 13 (Fig. 1) of the airplane. The discharging or launching device 12 (Fig. 2) is supported within the fuselage 11 as will be presently described so that contents may be launched or discharged, in the event of an accident, through an opening 14 in a wall 11a of the fuselage 11. This opening 14 is closed or sealed by a closure member 15, for example, of fabric or any other suitable material that can be ruptured by action of an appropriate part presently to be described of the discharging or launching equipment 12, when the latter is operated automatically upon the occurrence of an accident to free the opening 14 and thereby to permit free discharge or expulsion through said opening 14 of the contents stored within said launching or discharging equipment 12. It is to be understood, however, that other types of closure members for opening 14 may be substituted for the closure 15, such as a plate having the same curvature as the fuselage that can be attached to a movable part and, that will, for example, be tripped automatically to an open position in the event of an accident.

The launching or discharging equipment 12 in itself comprises a skeleton of frame parts 20 (Figs. 3, 4 and 7) shaped and joined together to provide a tubular storage device or container 21 of substantially rectangular section (as seen in Fig. 6). They may provide other shapes and sections. An over-all covering or skin 22 of metal or any other desirable material is applied and secured to these frame parts to define the side walls of said storage device 21. A fixed cover or closure 23 of similar material is provided for the uppermost end of said container 21. The bottom or loading end of the container 21 is provided with content retaining means in the form of a spring-actuated pivotally supported gate, closure or retainer 24 for purposes presently to be described in detail.

Tripable latching means 25 (Fig. 5) is provided in conjunction with the retainer 24 to maintain it in its retaining position after the storage device or container 21 of the launching equipment 12 has been loaded with its contents and to release said retainer 24 automatically in the event of an accident, as will presently be described, to permit discharge of said contents.

Guide rails or tracks 27 (Figs. 3, 4 and 7) are secured to the front and back portion frame parts 20 internally of the storage device 21. These tracks 27 are in the form of angle bars and extend in parallelism with the longer axis of the device 21. Separate pairs of spaced apart left and right hand shielding side plates 28, 29 (Figs. 7 and 10) are secured respectively to the left and right pairs of front and back guide rails or tracks 27. The spaces 30, 31 between these shielding plates are for purposes presently to be described.

The contents which are adapted to be loaded into the container 21 comprise a group of tubular cylinders 32, 33. These cylinders 32, 33 are preferably of substantially uniform size and are admeasured to be insertable into the storage device 21 within the space defined by the guide rails or tracks 27 and to be guided and retained within the storage device or container 21 one above another with their axes substantially parallel with each other. The longitudinal dimension of the container 21 is sufficient to receive a desired number of the cylinders 32 and 33. In the embodiment shown six such cylinders may be loaded as a group into the container 21 and be supported between the guide rails 27. The particular number of such cylinders 32, 33 that are to be inserted is optional, however, and corresponding dimensional changes may be made to provide space for larger or fewer numbers of such cylinders, or for differently dimensioned cylinders.

Some of the cylinders, for example, the cylinders 33 that are to be loaded into the storage device 21 have end protuberances or domes 34 of frangible material such as glass which provide protective seals for the contents of such cylinders and for actuating mechanisms thereof. The slots 30, 31 (Figs. 7 and 10) in the side plates 28, 29 are admeasured so that these domes 34 can move freely in them as well as project through them and beyond the opposite faces of the said side plates 28 or 29 for purposes presently to be described.

The cylinders 32, 33 are loaded into the storage device or container 21 through an opening in its bottom end which normally is closed by the retainer, closure or gate means 24. In the embodiment shown, this retainer or gate means 24 is supported by a spring type of hinge 40 (Fig. 3) attached suitably to the retainer or gate means 24 and to a wall or frame part of the device 21 so that the gate 24 can be swung on the hinge pin 41 into and out of closing or retaining relationship with the opening in the said bottom end of the storage device 21. The torsion springs 42 of the hinge tend always to urge the gate, closure or retainer 24 into an open position.

The latching means 25 (Fig. 5) which serves to lock the retainer or gate 24 in a closed position includes brackets 45. These brackets 45 are secured to the retainer or gate 24. Each bracket 45 has a slot 46 (Figs. 5 and 7) to receive a releasable claw or catch member 47 (Figs. 5, 7 and 9) provided on a pivotally supported arm 48. The pivotal supports 49 (Fig. 9) for the arms 48 are mounted in brackets 49a. The latter are secured to a plate member 49b as by screws 51 (Figs. 5, 7 and 9). The plate member 49b is secured to a covering or enclosing member 50 and to a frame part 20 of the container 21 as by screws 52 (Figs. 7 and 9). The arms 48 are all joined by a crossbar 53 (see Fig. 9). A crank rod or stop arm 54 is secured to the cross-bar 53. The stop arm 54 is positioned to cooperate with the inertia and pressure operated release arrangement now to be described.

In the embodiment shown, the inertia and pressure operated release mechanism includes a longitudinally slidable bar or shaft 60 (Figs. 7, 8 and 9). Spaced apart bearing brackets 61, 62 are secured to a portion 49b of plate member 49a or to other fixed parts. These brackets have aligned bearings 63, 64 (Figs. 8 and 9) to support the bar or shafts 60 slidably therein. The bearing 63 and the portion 60a of the shaft 60 that is slidable in said bearing 63 have a longitudinally extending groove or recess 63a which functions to prevent rotation of the shaft 60, as will be presently described, without, however, interfering with slidable movement of the rod 60. A transversely extending slot or recess 64 is provided in the rod 60 in its portion between the bearing brackets 61, 62 for purposes presently to be described. An enlarged or headed portion 65 (Fig. 9) is provided on the rod 60 adjacent its portion 63 and on the outer side of the bearing bracket 61. A portion 66 of reduced diameter joins the headed portion 65. A longitudinally extending slot 67 is provided in the reduced diametered portion 66 for purposes presently to be described. At its opposite end and extending outwardly of the bearing bracket 62, the shaft 60 has a preferably right hand threaded portion 68. A compression spring 69 is mounted on the threaded portion 68 with one of its ends abutting the bracket 62 in a centering recess 62a. A spring adjustment nut 70, preferably with right hand threads, is screwed onto the right hand threaded portion 68. The other end of the spring 69 abuts the inner face of this nut about a centering boss 70a. A lock nut 71, preferably with left hand threads, is threadedly engaged on another preferably left hand threaded portion 72 of the rod 60 which extends from the right hand threaded portion 68. The nut 71 has a flange portion 73 that may be tightened against the spring adjustment nut 70 to lock the latter in any adjusted position. The nut 70 has flat tightening faces and the nut 71 has openings for a spanner wrench or other tightening tool.

A bellows 75 of substantially cylindrical form is provided. The corrugated wall of this bellows permits longitudinal expansion and contraction as will presently be described. An end of the bellows is sealed by a head 76 and the opposite end of the bellows is sealed by a head 77. The head 76 is fixed permanently to a fixed bracket 79 as by screws 80 (Fig. 9). The fixed bracket 79 is supported from member 50 or other fixed part as by screws 81 so that the longitudinal axis of the bellows 75 lies aligned with the axis of the slide rod 60. The bellows head 77 has a portion 83 that is slidable in its axial direction in a guide bearing 84 of a bracket 85. The bracket 85 likewise is secured as by screws 86 to the member 50 or other fixed part. The portion 83 of the bellows head has an axially disposed bore 88 into which the reduced portion 66 of the slidable shaft 60 extends. A coupling pin 90 secured to the portion 83 extends into the slot 67 of the portion 66 that lies in the bore 88 to provide a fairly loose pin and slot coupling between the slidable head 77 of the bellows and the slidable shaft 60 for purposes presently to be described.

Because of the force exerted by the compression spring 69, the crank rod or stop arm 54 normally rests upon the surface of the slidable shaft 60 in the groove or recess 63a and out of alignment with the slot 64. This prevents rotation of the shaft 60. At such time the locking claws, or catch members 47 engage the brackets 45 in the slots 46 thereof. This engagement locks the retainer or gate 24 in its closed or retaining position counter to the opposing opening tendency of torsion springs 42 of the hinge 40. The action of torsion springs 42 is transmitted through the brackets 45 and claws 47 so as to tend to maintain the arm 54 on said surface of the slidable shaft 60. This surface acts as a stop to prevent the arm 54 from rotating and thus prevents disengagement of the claws 47 with the brackets 45. Such disengagement can occur only when the rod or shaft 60 is slid longitudinally in opposition to its compression spring 69 so that its slot 64 registers with the end 54a of the rod or arm 54.

The necessary longitudinal sliding movement of the rod or shaft 60 for release purposes can be effected in two ways. One way is a longitudinal shift of said shaft 60 in a direction toward the bellows 75 as a result of inertial movement thereof occurring upon a crash impact that is great enough to overcome the counteraction of spring 69 and permit the slot 64 and end of arm 54 to come into registry. An alternative way is the creation of pressure upon the bellows to compress it sufficiently as to cause it to draw the rod or shaft 60 by means of pin and slot coupling 90, 67 to a position where the slot 64 and end of arm 54 come into registry. The counterforce of compression spring 69 that determines the necessary inertial force of crash impact that must act to overcome the spring force can be adjusted to desired degree by the spring adjusting nut 70 which is locked in place after adjustment by the locking nut 71.

In practice, the launching device 12 bearing the release mechanism just described is supported in the vehicle so that the axis of slidable shaft 60 lies generally in the fore and aft direction of the vehicle with its headed portion 65 facing generally in the direction of flight and so that the compression spring 69 lies aft of the headed portion 65. This is necessary to secure the inertial longitudinal shift of the slidable shaft 60 in the proper direction forwardly to cause registry of slot 64 and the end 54a of latch control shaft or arm 54. The impact shock necessary to cause such registry can be adjusted as desired and depends upon the mass of the rod or shaft 60 and also upon the adjusted counterforce of the spring 69. An adjustment found suitable in practice is one that requires a shock of crash impact equal approximately to that created by sudden stoppage of a body having an acceleration of 2 g's, i. e., twice the gravitational constant of 32.174 ft. per sec. per sec., to cause sufficient shift by inertial forces of the rod or shaft 60 forwardly to cause the required registry of its slot with end 54a. This adjustment, however, is merely exemplary. Any desired adjustment can be made for sufficient inertial shift with different crash impact forces. When such registry occurs, the end 54a of rod or arm 54 is free to move enough into the slot 66 under action of torsion springs 42 to cause rotation of arms 48 about their pivotal supports in sufficient amount to free the claws 47 attached thereto from the latch brackets 45, in other words to permit unlatching of the brackets 45. This unlatching action permits the torsion springs 42 to act to swing the gate or closing member upon hinge pin 41 to open position.

In the event that the crash impact force is not great enough to cause the required inertial sliding movement of rod 60 necessary to effect unlatching as just described, or if for any other reason the crash impact itself fails to effect the unlatching described, if the accident has occurred in or over water and the aircraft or vehicle involved should sink, water will enter openings 46 provided in the enclosure 50 and surround the bellows 75. Since water pressure increases with increasing depth below its surface, the increasing water pressure acts to compress the bellows 75 in its longitudinal direction. This causes the movable bellows head 77 to move in its bearing 84 towards fixed head 76. As compression of bellows 75 continues, the pin 90 moves in slot 67 to engage the outer end thereof to cause sliding movement of the shaft 60 in the unlatching direction, i. e., the rod 60 and its slot 64 are drawn in opposition to the action of spring 69 towards registry of slot 64 with the arm end 54a. Registry occurs when the water pressure for which the bellows 75 and spring 68 have been adjusted is present. Since the head pressure of water increases proportionally to depth, it is a matter of computation to select the bellows 75 and the spring 68 to provide for an unlatching registration of slot 64 and arm 54 at any desired depth of submergence.

At sea level the bellows 75 is fully expanded within the limits permitted by the brackets 79 and 85. The pin 90 then lies intermediate the ends of slot 67 and slot 64 is then kept out of registry with end 54a of arm 54 by the force exerted by the compression spring 69. Above sea level, for example, at flight altitudes the air pressure about the bellows 75 that enters openings 95 is lower than at sea level. Hence the bellows 75 will remain expanded within its limiting brackets 79 and 85. The bellows 75 will not become operative either at or above sea level to move the rod or shaft 60 and its slot 64 into an unlatching position. The said intermediate position of pin 90 in slot 67 will, however, permit inertial shift of shaft 60 to an unlatching position upon the occurrence of crash impact as described. The slot 67 is long enough to permit such independent action. If desired either the inertial crash impact release arrangement or the water pressure actuated release arrangement can be eliminated and only one of the two used. Primarily the water pressure arrangement as described is operable in the event of failure of the crash impact arrangement.

It is desirable that the contents loaded into the launching device 12 be expelled forcefully when either the inertia or the pressure-actuated release mechanism just described trips the latching claws 47 to release the closure or gate 24 for movement to its discharging or open position under action of torsion springs 42. In the embodiment shown, two expelling arrangements are provided. One of such arrangements comprises a bar or rod 100 (Figs. 3, 4, 6 and 10) that extends transversely between the plates 28, 29 extending through the slots 31 thereof. Tensioning springs 101 are secured at 102 to these rods and at 103 to fixed portions of the frame parts 20. These springs 101 exert a force tending to move the bar or rod 100 in the slots 31 toward the discharge opening of the storage device 21 that is normally closed by the closure or gate member 24. Blocks 104 having concave surfaces 105 (Figs. 6 and 10) complemental in shape to the curved surfaces of the cylinders 32, 33 that are loaded into the container are attached to the bar or rod 100 at spaced apart points (Figs. 4, 6 and 10). When the cylinders 32, 33 are loaded into the storage device 21, the concave surfaces 105 engage the curved surface of the first one of them that is inserted. This one and the others when loaded into the container in succession move the bar 100 upwardly in opposition to the springs 101. When fully loaded, the bar 100 lies at the far or upper end of the storage device 21 as shown in Figs. 3 and 4 and the springs 101 are stretched exerting a counterforce in the ejecting direction which cannot act as long as the gate or closure 24 is latched in its closing position as described.

Figure 3:
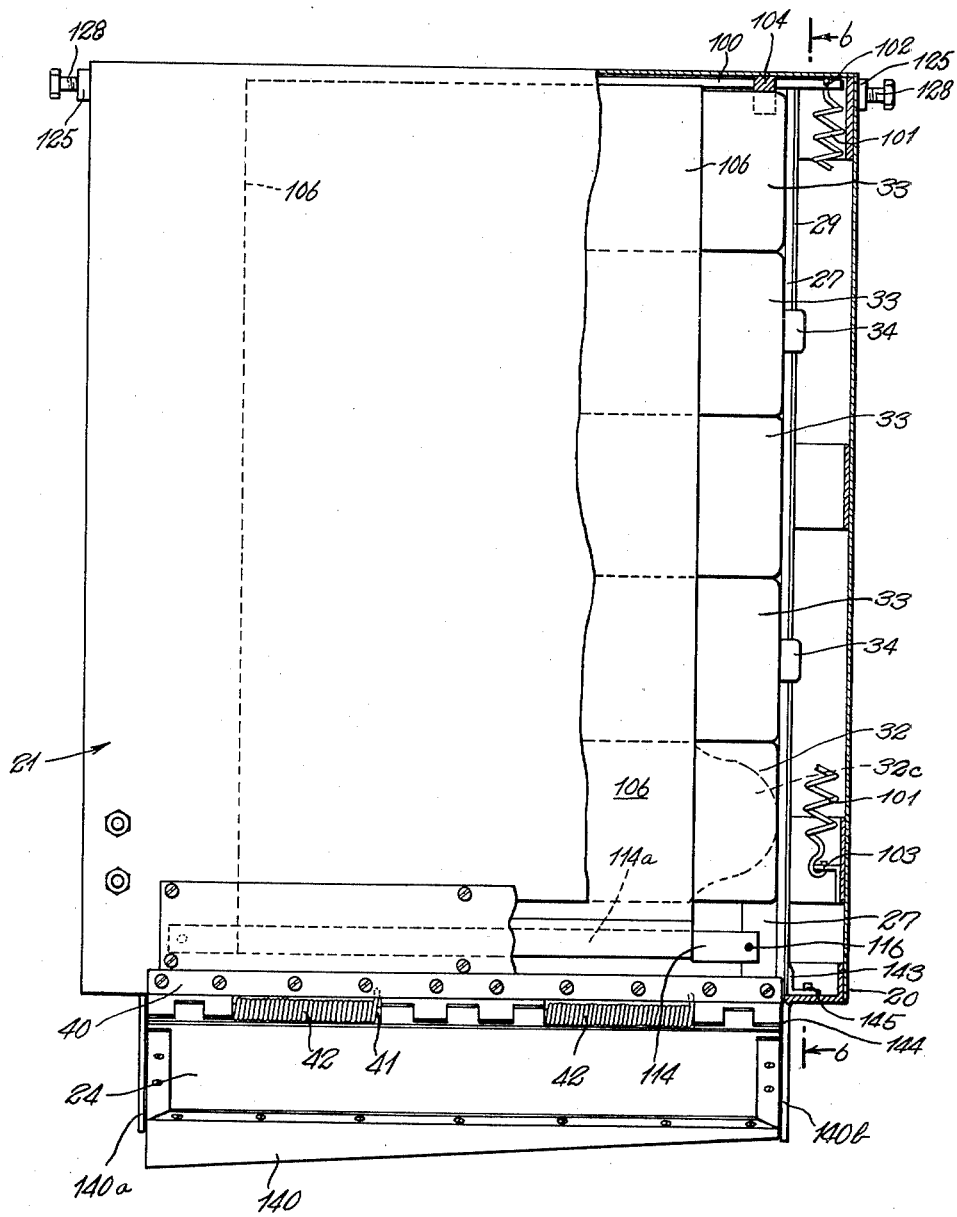
Fig. 3 is an enlarged top plan view of launching and discharging equipment embodying the invention partially broken away and partially sectionalized to show structural details.

The second of the ejecting arrangements comprises a wide band 106 of fabric or suitable other material (Figs. 3, 4, 6 and 10). This band 106 preferably is of less width than the space between the blocks 104 (Figs. 3 and 4). The band 106 is mounted upon a spring-actuated roller 107 (Figs. 4, 6 and 10). This roller 107 is provided with a torsion spring 108 (Fig. 4). The roller has opposite heads 107a and 109. Head 107a is fixed to roller 107 while the latter is rotatable relative to head 109, so that when the opposite heads 107a and 109 of the roller 107 are mounted in oppositely located brackets 111, 111a that are supported suitably from frame parts 12 of the storage device 21 as by screws 112, the head 109 is fixed against rotation in its bracket 111a while head 107a can be rotated in its bracket 111 so that the band 106 may be unwound from the roller 107 which rotates against the opposition of the torsion springs 108. One end 108a of the spring is attached to head 107a. The other end 108b is attached to head 109. The brackets 111, 111a support roller 107 substantially in parallelism with the axes of the cylinders 32, 33 and to one side thereof from one face of the storage device 21. In the embodiment shown, the axis of the roller 107 lies outside the under or rear face of the device 21. A portion 50a of the protective cover 50 encloses the roller 107 to protect it and to prevent external access thereto. The free end of the band 106 wound upon the roller has a U-shaped bar 114 (Figs. 3 and 6) attached to it. This U-shaped bar 114 lies in a loop 114a provided in the end of the band 106 (Figs. 3 and 6). The bar 114 extends in parallelism with the axis of roller 107 and is secured to the frame parts 20 on the inner side of the upper or front face of the storage device 21 as by screws 116. It is U-shaped to prevent the band 106 from sliding longitudinally on it. When the cylinders 33, 32 are inserted into the container 21, the band 106 is unwound from the roller 107 in opposition to the action of the torsion springs 108 thereof in similar manner to the unrolling of a shade from a conventional shade roller except that no locking pawls are provided. As a result, during loaded condition, because the other end of the fabric is attached to the U-shaped crossbar 114, the band 106 is always under tension caused by torsion springs 108. This tension tends to rewind the band 106 upon the roller 107. The cylinders 33, 32 are loaded into the container with the band 106 engaging around the curved surface of the first of such cylinders inserted. In a fully loaded device 12 the band is unwound from roller 107 sufficiently to extend along the inner faces of the wider side walls of the storage device 21 and around the uppermost surface of the innermost cylinder 33 as seen in Fig. 6. The tension of the torsion springs 108 then tends to rewind the band 106 on roller 107 and, in so doing, to eject the cylinders 32, 33 from the storage device. This action, however, is prevented by the closure member or gate 24 until one of the release mechanisms operate as described to permit movement of the claws 47 to unlatching position as previously described. When the gate 24 is released or freed, the combined forces of tension springs 101 and of torsion springs 108 acting respectively upon the cross-bar 100 and upon the band roller 107 as described are sufficient to expel all the cylinders 33, 32 effectively and forcefully from the storage device 23 to drive them clear of the vehicle involved in the accident (see Fig. 10).

Brackets 125 (Figs. 2, 3 and 10) secured to the fuselage frame 127 or other fixed part of the aircraft or other vehicle are provided. The launching or discharging device 12 is secured pivotally at 128 from these brackets so that the axis of the inertia shaft 60 extends substantially parallel with the fore and aft direction of the aircraft and with its headed portion 65 facing generally in the direction of motion of the aircraft or other vehicle. Furthermore, the pivotal supports 128 are so positioned that the gate or closure 24 lies at the lowermost end and may be secured after the loading of storage device 21 with its cylinders 33, 32 in the full line position shown in Fig. 2 in proximity to the fabric or other closure 15 (Figs. 2 and 10) covering the discharge opening 14 in the wall of the fuselage 11. Suitable brackets 130 secured to the fuselage 11 at 131 and attachable as by nuts 132 to bolts 133 upstanding from the launching or discharging equipment 12 serve to maintain the loaded launching equipment 12 in said full line position. For inspection, the launching or discharging equipment 12 may be disattached from the brackets 130 to swing on pivots 128 to a loading position, shown in dotted line in Fig. 2. At that time the closure or gate 24 can be unlatched and swung clear of the entrance to storage device 21 so that the cylinders 33, 32 may be inspected in the latter. After inspection the gate 24 is latched and the device 12 fastened in its full line position of Fig. 2. During inspection the roller 107 can be locked against rotation as will be described.

The discharge opening 14 in the fuselage has a closure 15 of rupturable material, as previously described. This closure must be ruptured, or the opening 14 otherwise cleared, to permit ejection of the contents from the launching or discharging device 12. A convenient arrangement for effecting this rupture or clearing are knife blades or sharpened cutting members 140, 140a and 140b secured to an outer face of the gate or closure member 24 (Figs. 2, 3, 4, and 10). Each of these blades 140, 140a, 140b tapers in its length so that it will effectively cut through the rupturable closure 15 at 15a (Fig. 2) when the gate or closure member 24 is unlatched either by crash impact or water pressure as described and swung to its open position by the hinge torsion springs 42, as shown in dot-dash position in Figs. 2 and 10. Other arrangements for uncovering or clearing the discharge opening 14 may be provided.

Inasmuch as some of the cylinders loaded into the storage device 12, namely, cylinders 33, have frangible domes 34 that must be destroyed to make the contents of such cylinders available for use, for example, by self-contained discharging mechanisms that become operative upon access of water to parts protected by such frangible domes 34, it is desirable to provide means within the launching or discharge equipment 12 that will effect such destruction of the domes 34 upon the ejection of the cylinder 33 from the storage device 21. Such means conveniently referred to as a conditioning means, in the embodiment shown, comprises a sharp glass breaker or sharp abutment 143 secured to the side plates 144 to lie in the path of travel of the domes 34 as the cylinders 33 bearing the latter are ejected from the launching device 12 by bar 100 and by band 106. Since it is desirable to load the cylinders 33 into the device 12 with their domes 34 extending alternately in opposite directions, two such blades or abutments 143 are provided, one adjacent each of the pairs of shield plates 28 29 (Figs. 7, 4, 5 and 6) aligned with the spaces 30, 31 and in the ejection path of travel of the domes 34. These blades 143 are secured on the side plates 144 by screws 145 and the side plates can be taken off from the frame 20 by unscrewing screws (not shown) so that they permit insertion of the cylinders. But the side plates are replaced in their operative positions for loading (Fig. 3). Thus, when the cylinders 33 are ejected after the gate or closure 24 is opened as a result of crash impact or of water pressure as described, the domes 34 strike these blades or abutments 143 and are shattered as the cylinders 33 are ejected from the storage device 21 to condition them, i. e., to facilitate access of water to the dome protected mechanisms of the individual cylinders 33 for rendering the latter operative in water or otherwise. The shield plates 28, 29 protect the rails 27 from being jammed by glass fragments.

During inspection, the launching and discharging equipment 12 has the dotted line position shown in Fig. 2 with the gate or closure 24 open. In loading the embodiment shown, five cylinders 33 with their domes 34 alternately projecting in opposite directions are inserted one by one against the opposing forces of the tension springs 101 and torsion springs 108 acting respectively upon the ejection bar 100 and upon band 106. A cylinder 32 containing, for example, a mercury switch controlled signal light L (Fig. 10) that remains unlit while the cylinder 32 lies in substantially horizontal position or inverted vertical position or positions between these two is inserted as the sixth of the group of cylinders 32, 33 within the storage device 21. The tube 32 is shorter in length than cylinders 33 and to compensate for this its dome end is provided with an extension covering 32c so that it will fit between the rails 27 for easier operation. The extension covering is split into half cylinders that fall away upon ejection from the device. The signal light of cylinder 32 automatically lights when the cylinder 32 has been ejected at the scene of the accident and floats substantially upright in water. The contents of the cylinders 33, for example, are dye markers that upon expulsion from the individual cylinders 33 serve to color the areas of water at the scene of expulsion. These cylinders may have differently timed mechanisms for expelling their dye markers at different periods of time after they land in the water. The expulsion mechanisms of each such cylinder 33 include mechanism requiring access of water to operate them and time delay mechanism also controlled by access of water thereto to regulate the time of access of water to the expulsion mechanisms. Access of water to the time delaying mechanisms of the cylinders is permitted by the destruction of the frangible domes 34 of the cylinders 33 at the time of their ejection from the storage device 21. The cylinder 32 and five cylinders 33 of the group in the device 21 are launched or ejected substantially at the same time from the latter. The time delaying mechanisms of each cylinder 33 are differently timed so that the contents of the cylinders 33 are expelled from them in timed sequence to provide either colored marking areas in the vicinity of the accident over a longer period of time than is possible by using only one such cylinder 33, or a trail of colored areas, in the event that the discharged cylinders 33 drift from the scene of the accident between the times of the ejection of the group from the launching and discharging equipment 12 and the individual expulsions of the dye marking contents of the various cylinders 33.

The particular internal constructions of the cylinders 32 is described in a copending application of Martin Dwyer and Philip B. Edwards entitled Self-contained night-time signalling device, filed on July 17, 1947. The particular internal constructions of the cylinders 33 are described in a copending application of Martin Dwyer and Philip B. Edwards entitled Self-contained emergency signalling device adapted to be operated automatically after being launched, filed July 17, 1947. No claim is made in this application to their particular contents or arrangements because, any types of cylinders bearing useful contents to be discharged at the scene of an accident automatically from the launching equipment 12 that will fit into the latter may be loaded therein prior to the departure of the airplane or other vehicle from its starting point.

Upon the occurrence of an accident resulting in a crash impact sufficient to move the inertia rod 60 to its latch tripping position, or upon submergence of the vehicle to a depth in water sufficient to cause the bellows 75 to move said rod 60 to its latch tripping position, the claws 47 release the gate or closure member 24 which then swings open violently under the action of springs 42, 101 and 108. This opening of the gate 24 causes the knives 140, 140a and 140b to cut through the fabric closure 15 and clear or uncover opening 14. The tension springs 101 and torsion springs 108 also act respectively upon the bar 100 and band 106 to eject all the cylinders 32, 33 in the device 12 through opening 14 into the water or area about the wrecked vehicle. During such ejection the domes 34 of cylinders 33 are fractured or destroyed exposing their operating parts or otherwise conditioning them for self-action as described.

During inspection, it is desirable to lock the band roller 107 against rotation urged by its spring 108. To this end the bracket 111 (Figs. 4a and 4b) is slotted in its face to receive the extension 107a of the roller head 107. The head 107a has a pair of slots 107b (Figs. 4 and 4a) which are exposed in slotted portion 111b of the bracket 111. To lock the roller head 107a, a U-shaped locking key 150 (Fig. 4c) may be slid into slots 111b so that its legs 151 engage in the slots 107b. The key 150 has a head 152 engageable with a recessed portion 111c of the bracket 111. When so positioned, the key locks the roller head 107a and with it the roller 107 against rotation. The key 150 is only inserted during inspection periods when it is desired to prevent the spring 108 from rewinding the roller 107. A locking arrangement (not shown) may also be provided for locking the spring 101 against contraction during inspection periods.

Retaining rings 155 are force fitted onto the roller 107 to prevent the band 106 from sliding.

The launching or discharging equipment described thus provides an effective arrangement for automatically expelling signalling and other types of useful equipment at the scene of an accident to facilitate location of the scene or to aid survivors and which is automatically put into operation either as a result of the crash impact or as a result of the sinking of the aircraft or other vehicle involved at the scene of the accident. It further provides an arrangement whereby a group including a night signal and daytime signalling devices having different operating times may be discharged substantially simultaneously at the time of the accident as a group and be rendered operative or conditioned for self-operation as incidents of their discharge from the launching equipment to become effective as signals at successively different times after the accident. It further provides launching equipment that can be utilized to discharge various other useful devices at the scene of an accident automatically that will facilitate rescue work, the location of the scene and to aid survivors until rescued.

Still another feature of the invention is that it provides launching or discharge equipment of the character described which is possible to be installed at the most convenient and accessible location in many types of airplane. It is space saving and easy for inspection.

Still another feature of the invention is that it provides launching or discharge equipment of the character described which is safe during installation and in which there is no danger of fire hazard or explosion even during launching or discharging.

Still another feature of the invention is that it provides launching or discharge equipment of the character described that can be used permanently on the airplane and whose contents can be replaced.

While specific embodiments of the invention have been disclosed, structural variations are possible and are contemplated within the scope of the claims. There is no intention, therefore, of limitation to the exact details shown and described.

What is claimed is:

1. Launching or discharging equipment of the character described comprising storage means for contents to be discharged at the scene of an accident, retaining means for maintaining the stored contents within said storage means prior to an accident, supporting means for maintaining said equipment in proximity to a discharge opening, a rupturable cover for said opening, release means operable automatically in response to inertial forces resulting from the crash impact of an accident for freeing said retaining means in the event of such an accident, and cover rupturing means attached to said retaining means for clearing said discharge opening upon the freeing of said retaining means and thereby then permitting discharge of said stored contents from said equipment through said discharge opening.

2. Launching or discharging equipment of the character described comprising storage means for contents to be discharged at the scene of an accident, retaining means for maintaining the stored contents within said storage means prior to an accident, supporting means for maintaining said equipment in proximity to a discharge opening, a rupturable cover for said opening, release means operable automatically in response to water pressure resulting from submergence of the launching equipment at the scene of an accident for freeing said retaining means in the event of such an accident, and cover rupturing means for clearing said discharge opening upon the freeing of said retaining means and thereby then permitting discharge of said stored contents from said equipment through said discharge opening.

3. Launching or discharging equipment of the character described adapted for installation in aircraft or other vehicles comprising a storage device for contents useful at the scene of an accident involving the vehicle in which the launching or discharging equipment is installed, retaining means for maintaining contents stored within said storage device until the occurrence of such an accident, crash-impact actuated release means operable in response to inertial forces of crash impact of said accident for freeing said retaining means and thereby then permitting discharge of said stored contents from said equipment, water-pressure actuated release means operable independently by water pressure resulting from the submergence of said vehicle at the scene of said accident for freeing said retaining means in the event of failure of operation of said crash-impact actuated release means, means for supporting said launching equipment within said vehicle in proximity to a discharge opening thereof, closure means for said discharge opening, and closure opening means secured to said retaining means to clear said discharge opening upon said freeing of said retaining means.

4. Launching or discharging equipment of the character described adapted for installation in aircraft or other vehicles comprising a storage device for contents useful at the scene of an accident involving the vehicle in which the launching or discharging equipment is installed, retaining means for maintaining contents stored within said storage device until the occurrence of such an accident, crash-impact actuated release means operable in response to inertial forces of crash impact of said accident for freeing said retaining means and thereby then permitting discharge of said stored contents from said equipment, water-pressure actuated release means operable independently by water pressure resulting from the submergence of said vehicle at the scene of said accident for freeing said retaining means in the event of failure of operation of said crash-impact actuated release means, supporting means for maintaining said launching equipment within said vehicle in proximity to a discharge opening thereof, a rupturable cover for said opening, and cover rupturing means attached to said retaining means for clearing said discharge opening upon said freeing of said retaining means.

5. Launching or discharging equipment of the character described adapted for installation in aircraft or other vehicles comprising a storage device for contents useful at the scene of an accident involving the vehicle in which the launching or discharging equipment is installed, retaining means for maintaining contents stored within said storage device until the occurrence of such an accident, crash-impact actuated release means operable in response to inertial forces of crash impact of said accident for freeing said retaining means and thereby then permitting discharge of said stored contents, water-pressure actuated release means operable independently by water pressure resulting from the submergence of said vehicle at the scene of said accident for freeing said retaining means in the event of failure of operation of said crash-impact actuated release means, tension spring-actuated means and torsion spring-actuated means acting jointly for expelling the stored contents from said storage device when said retaining means is freed, and activating means operable upon individual of the stored contents during their expulsion from said storage device to condition them for self-operation after their expulsion from said storage device.

6. Launching or discharging equipment of the character described for installation in aircraft or other vehicles comprising a storage device for contents useful at the scene of an accident involving the vehicle in which such equipment is installed, retaining means for maintaining contents stored within said device in an inactive condition until the occurrence of such an accident, release means operable automatically in response to forces resulting from the accident to free said retaining means, supporting means for maintaining said installed equipment within said vehicle in proximity to a discharge opening thereof, a cover for said opening, means attached to said retaining means for opening said cover and clearing said opening upon the freeing of said retaining means, and activating means operable upon the stored contents during their discharge from said storage means to condition them for self-operation after their discharge from said storage means.

MARTIN DWYER.
CHI MOU TSANG.

REFERENCES CITED

The following references are of record in the file of this patent:

UNITED STATES PATENTS

| Number | Name | Date |
|---|---|---|
| 1,166,651 | Beck | Jan. 4, 1916 |
| 1,836,495 | Paulson | Dec. 15, 1931 |
| 1,860,327 | Kuhn | May 24, 1932 |
| 2,190,531 | Kaboskey | Feb. 13, 1940 |
| 2,357,417 | Marple | Sept. 5, 1944 |
| 2,380,587 | Fenton | July 31, 1945 |

FOREIGN PATENTS

| Number | Country | Date |
|---|---|---|
| 375,758 | France | May 22, 1907 |